United States Patent [19]

Serby

[11] Patent Number: 4,930,419
[45] Date of Patent: Jun. 5, 1990

[54] ORDNANCE FUZE POWER SOURCE

[76] Inventor: Victor M. Serby, 255 Hewlett Neck Rd., Woodmere, N.Y. 11598

[21] Appl. No.: 355,768

[22] Filed: May 23, 1989

[51] Int. Cl.$^5$ .............................................. F42C 19/00
[52] U.S. Cl. ................................... 102/207; 102/221; 102/293
[58] Field of Search ............... 102/206, 207, 221, 262, 102/293

[56] References Cited

U.S. PATENT DOCUMENTS 3,839,963 10/1974 Nathan et al. ..................... 102/262

Primary Examiner—Charles T. Jordan
Attorney, Agent, or Firm—Victor M. Serby

[57] ABSTRACT

The present invention is an ordnance fuze power source assembled from commercially available cells to form, fit and function in place of the lead/lead dioxide/fluboric acid spin activated reserve batteries now used by the Army and the Navy. Specifically, direct replacements for the U.S. Army HDL P/N 11744726 and 5058639 power sources were made using a series connection of commercially produced lithium anode cells in series with an acceleration activated switch supported in an epoxy matrix. However, the invention is applicable to other fuze power sources as well. Adoption of this invention by the armed forces will ease the logistics burden at the onset of a national emergency by providing a readily available supply of fuze batteries.

9 Claims, 1 Drawing Sheet

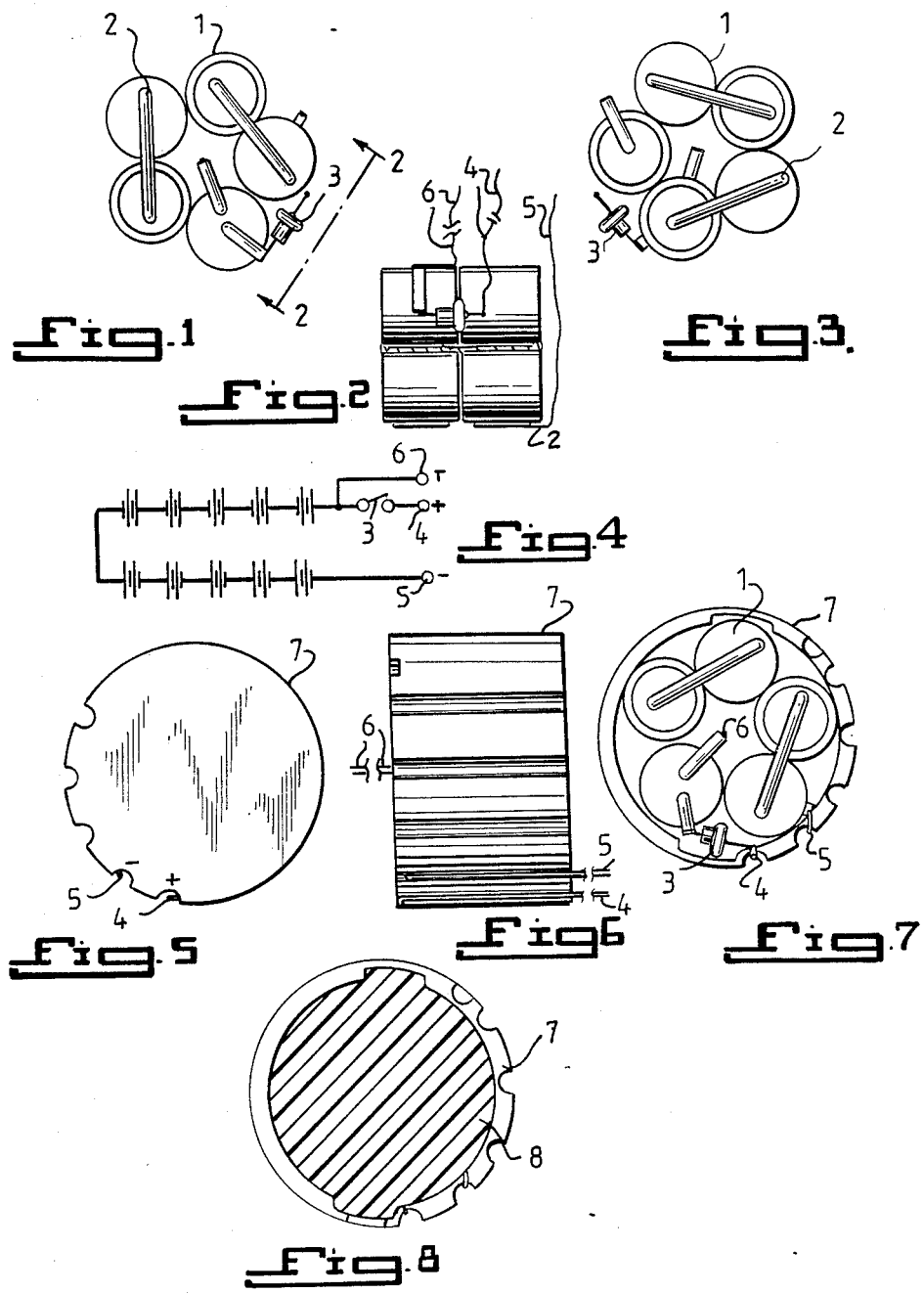

ORDNANCE FUZE POWER SOURCE

STATEMENT AS TO RIGHTS OF INVENTION UNDER FEDERALLY SPONSERED R&D

This invention was made with Government support under contract DAAL02-87-C-0116 and under contract DAAL02-89-C-0019 awarded by ISA/LABCOM-Directorate of Contracting, U.S. Army Harry Diamond Laboratories (HDL). The Government has certain rights in this invention.

BACKGROUND OF INVENTION

This invention is concerned with ordnance fuze power sources. Many types of military ordnance utilize some form of battery to power the fuzing, control or arming systems. In the case of artillery shells, these power sources can see 26000 g's combined setback and spin accelerations when the shell is fired, and must be capable of surviving these accelerations. In addition, the power sources must be capable of meeting a wide temperature range. A storage shelf life of the battery of about 5 years is required because the battery is often incorporated in the electronics and may sit for some time until the shell is fired. The battery must not activate from slight shocks or jars as would be encountered if the shell were to be accidentally dropped, but must fully activate upon at least a 1100 g setback acceleration. Furthermore, fuze batteries must have high power densities compared to comparably sized batteries used in other applications.

Spin activated reserve batteries which can meet all these requirements exist and are currently in production and use but they are very expensive. Another problem is that these batteries are difficult to manufacture so that at the onset of a national emergency production levels are expected to lag requirements for several months, thereby creating logistics problems.

What is needed is an inexpensive battery which can be easily assembled in large quantities with little set up time, and form, fit and function in place of the current military versions. The relative low cost of this battery will be a big plus, but more importantly the quick availability of the battery during national emergency will give a distinct logistics advantage over using the current spin activated reserve batteries. Prior attempts to construct a primary battery which will directly replace the spin activated reserve batteries have heretofore failed.

SUMMARY OF INVENTION

The present invention is an ordnance fuze power source assembled from commercially available cells to form, fit and function in place of the lead/lead dioxide/fluboric acid spin activated reserve batteries now used by the Armed Services. Lithium anode primary cells are assembled in series/parallel connections to meet the current and voltage requirements of the battery. An acceleration activated switch is placed in series with the cells so that the minimum gunfire acceleration will activate the switch and allow current flow through the battery to the load. High acceleration survivability is insured by actual centrifuge testing of individual cells of a given cell type to insure they will not fail under the maximum required acceleration. The cells are then assembled and placed in a case conforming to the required outline dimensions. Potting of the assembled cells in a potting matrix, preferably a high modulus, high strength epoxy will then insure the survivability of the battery assembly under gunfire conditions.

Specifically, direct replacements for the HDL P/N 11744726 and 5058639 power sources were made using commercial cells but the invention is applicable to other fuze power sources as well. This is useful because during the onset of a national emergency, production levels of the currently used power sources may lag requirements by several months thereby creating severe logistics problems. The invention will alleviate this logistics burden by providing a readily available supply of fuze power sources until production levels of the MIL version become adequate. Having a limitless supply of fuze power sources at the onset of an emergency would give the US Army and its allies a distinct tactical advantage. Another advantage of the invention over the spin activated batteries now in use is price. It is expected that the unit price of ordnance fuze power sources made using the invention will be substantially less than that of the lead/lead dioxide/fluboric acid battery now in use without compromise in performance or reliability. It is even foreseeable that the invented power source may replace the current one altogether.

Specific goals of the invention are to meet a specified outline drawing, meet temperature requirements of about $-30°$ C. to $+60°$ C., have a minimum 5 year storage shelf life, not activate from ordinary jars and shocks yet fully activate when fired with a minimum of 1100 g acceleration, survive 26000 g combined setback and spin accelerations, and meet specified current and voltage requirements.

It was discovered by analysis and/or experimentation that a battery assembly comprising a series connection of lithium anode primary cells potted in an epoxy matrix and having an acceleration activated switch in series with said cells would function properly as a power source in ordnance fuze applications. It was further discovered that for a specific application requiring a voltage output of at least 23 volts at 72 ma for the first 5 seconds and then 7.2 ma for the next 130 seconds and finally 72 ma for the next 15 seconds, and ability to survive gunfire accelerations of 26,000 combined setback and spin, a series connection of 10 to 12 $\frac{1}{3}$ N Li/MnO$_2$ spiral wound cells would work best in the application although a series connection of 10 to 12 Li/MnO$_2$ coin cells would function properly if the cells were specially selected for their electrical performance. The cells are assembled using standard battery connection techniques with an acceleration activated switch placed in series with said cells. The cells are insulated from each other and placed in a case having the required outline configuration and potted using a high modulus, high strength potting compound, preferably an epoxy which rigidly supports the cells and the switch, to form the finished ordnance fuze power source. Alternatively, any rigid support means for the cells and switch which prevents relative motion under gunfire accelerations such as an injection molded plastic receiver having holes to accept the cells and switch, will perform substantially the same function in substantially the same way as the epoxy potting matrix.

BRIEF DESCRIPTION OF THE DRAWINGS

FIGS. 1–8 show the preferred embodiment of the invention. FIG. 1 shows a top view of a ten cell series assembly of $\frac{1}{3}$ N lithium anode cells with an acceleration activated switch placed in series with said cells.

FIG. 2 is View 2-2 as indicated in FIG. 1 of said assembly.

FIG. 3 is a bottom view of said assembly.

FIG. 4 is the equivalent electrical circuit of this preferred embodiment of the invention.

FIG. 5 is the bottom (breech end) view of the case in which said cell assembly is placed.

FIG. 6 is a side view of said case.

FIG. 7 is a top (muzzle end) view of said case with the cell/switch assembly inserted.

FIG. 8 is a top view of FIG. 7 after potting with an epoxy potting compound to prevent relative movement of the cells and switch under gunfire accelerations.

DESCRIPTION OF PREFERRED EMBODIMENT

Referring to FIGS. 1 to 3, ten lithium anode/manganese dioxide cathode, ⅔ N cells (1) are connected in series by using nickel tabs (2) or other means standard in the industry. The cells are kept insulated from each other during assembly to prevent electrical short circuits. The spin axis of the cell assembly essentially coincides with the geometric center axis of an imaginary circumscribed cylinder. A normally open acceleration activated switch (3) is placed in series with the cell connection and oriented so that its axis of symmetry is essentially perpendicular to a radial plane of the device and located at a sufficient radial distance from the spin axis so that either the axial acceleration above the switch's threshold value caused by gunfire or the radial acceleration caused by the spinning projectile will close the switch. As the artillery shell spins as it travels to its target, the radial acceleration keeps the switch closed. Alternatively, a latching type acceleration activated switch or an acceleration activated switch used in conjunction with an SCR to achieve a latching function can be used for shells fired out of unrifled barrels such as in a mortar to maintain circuit continuity in the absence of a threshold acceleration. When the switch is in the open position current can not flow through the battery to the load which is connected through positive (4) and negative (5) lead wires. A test lead wire (6) is provided for the purpose of determining battery condition after potting without having to first accelerate the power source to the threshold acceleration. FIG. 4 is a schematic representation of the fuze power source. With an OCV of 3.2 volts per cell, the nominal voltage of this power source is 32 volts. The voltage under the following load profile will be above 23 volts: 320 ohms for 5 seconds, 3200 ohms for 130 seconds and 320 ohms for 15 seconds. The cell/switch assembly is then inserted into a glass filled polycarbonate case (7) having the required outline dimensions of the fuze power source and potted using an epoxy (8) having a strength of about 5000 PSI and a Young's modulus of about 500,000 PSI to form the finished power source. It is important to select a potting material which will not exceed the maximum recommended temperature of the cells during the exothermic curing reaction.

Other preferred embodiments exist where other voltage and current levels are needed. Spiral wound lithium anode/liquid cathode cells such as lithium/sulfur dioxide, lithium thionyl chloride or lithium sulfuryl chloride, are recommended for extremely high rate applications or where extremely low temperature operation is required. But fuze power sources assembled from liquid cathode cells having a vent must have all the cell vents facing away from the breech end of the power source and towards the muzzle end. Otherwise, the setback acceleration upon firing the shell will increase the pressure in the liquid cathode/electrolyte near the vents sufficiently to rupture them and thus destroy the battery. Cell chemistries having significant voltage delays must be avoided in critical applications or else serious timing errors will result with corresponding ineffectiveness of gunfire. For low voltage applications, a single lithium anode cell in series with an acceleration activated switch with a means to support the cell and switch will work in the application.

Although a specific embodiment of the present invention has been described in detail above, it is readily apparent that those skilled in the art and science may make various modifications and changes to the present invention without departing from the spirit and scope thereof. These changes include but are not limited to substitution of battery chemistries, substitution of equivalent circuits, substitution of the number of cells in the battery or incorporation of the invention as a feature of other equipment. It is to be expressly understood that this invention is limited by the following claims:

What is claimed is:

1. An ordnance fuze power source having a breech end, a muzzle end and a spin axis, said spin axis intersecting said muzzle end and said breech end, said ordnance fuze power source comprising:
   (a) a lithium anode primary cell;
   (b) an acceleration activated switch having a first open state in absence of a threshold applied acceleration, said switch having a responsive axis, said switch having a second closed state in the presence of an applied threshold acceleration along said responsive axis, said switch connected in series electrically with said cell, said switch physically positioned within said fuze power source radially away from said spin axis, said switch having said responsive axis aligned toward said spin axis;
   (c) means for securing said cell and said switch from relative motion under applied gunfire acceleration; and
   (d) means for connecting said series connection of said cell and switch to an electrical load so that in the presence of an applied acceleration above a threshold value along said responsive axis, said switch will close and an electric current will be delivered to said load.

2. An ordnance fuze power source as claimed in claim 1 wherein said cell has manganese dioxide as a cathode material.

3. An ordnance fuze power source as claimed in claim 1 wherein said cell has a liquid cathode.

4. An ordnance fuze power source as claimed in claim 1 wherein said supporting means is a potting compound in which said cell and said switch is embedded.

5. An ordnance fuze power source as claimed in claim 1 further comprising latching means
   to maintain circuit continuity when the applied acceleration falls below said threshold value.

6. An ordnance fuze power source as claimed in claim 1 wherein: said cell has a vent, and said vent is positioned toward said muzzle end in said power source.

7. An ordnance fuze power source comprising:
   (a) a series electrical connection of 10 lithium/manganese dioxide ⅔ N size cells having a geometric axis within its physical bounds;
   (b) an acceleration activated switch having an axis of symmetry, said switch having a first open state in the absence of an applied threshold acceleration perpendicular to said axis of symmetry and a second closed state in the presence of an applied threshold acceleration perpendicular to said axis of symmetry, said switch connected electrically in series with said series connection of cells, said switch physically positioned in a plane containing said axis of symmetry, said plane essentially parallel to sad geometric axis; and (c) an epoxy potting compound in which said series connection of cells and said switch are embedded to rigidly support said series connection of cells and said switch in their relative positions.

8. An ordnance fuze power source as claimed in claim 7 further comprising a case having an open muzzle end, a closed breech end, and a sidewall, said case having a spin axis running longitudinally from said muzzle end to said breech end, said case having an inside and an outside, said outside conforming to required outline dimensions of said ordnance fuze power source, said inside fully accepting said series connection of cells and said acceleration activated switch through said muzzle end, said geometric axis of said cells essentially coinciding with said spin axis of said case, said epoxy potting compound rigidly binding to said case to prevent relative movement between said case and said cells.

9. An ordnance fuze power source comprising:
(a) a lithium anode primary cell;
(b) an acceleration activated switch having a first open state in absence of a threshold applied acceleration and a second closed state in the presence of an applied threshold acceleration, said switch connected in series electrically with said cell;
(c) means to secure said cell and said switch from relative motion under applied gunfire acceleration; and
(d) means to connect said series connection of said cell and switch to an electrical load so that in the presence of an applied acceleration above a threshold value, said switch will close and an electric current will be delivered to said load.

* * * * *